United States Patent [19]

Kato et al.

[11] 4,066,332
[45] Jan. 3, 1978

[54] REAR PROJECTION SCREENS

[75] Inventors: Hisatoyo Kato; Junji Miyahara, both of Minami-ashigara, Japan

[73] Assignee: Fuji Photo Film Co., Ltd., Minami-ashigara, Japan

[21] Appl. No.: 651,872

[22] Filed: Jan. 23, 1976

[30] Foreign Application Priority Data

Jan. 24, 1975   Japan ................................ 50-10240

[51] Int. Cl.² .............................................. G03B 21/60
[52] U.S. Cl. ...................................... 350/126; 96/116; 350/276 R
[58] Field of Search ............... 350/126, 117, 128, 129, 350/276, 156; 240/41.4 R, 41.4 D; 96/116; 313/112; 178/7.82, 7.85; 250/237 G

[56] References Cited

U.S. PATENT DOCUMENTS

| 2,980,567 | 4/1961 | Steel | 350/276 R X |
| 3,330,692 | 7/1967 | Ehrlich | 350/276 R |
| 3,779,630 | 12/1973 | Clausen et al. | 350/117 |
| 3,832,031 | 8/1974 | Land | 350/117 |

*Primary Examiner*—Richard A. Wintercorn
*Attorney, Agent, or Firm*—Sughrue, Rothwell, Mion, Zinn and Macpeak

[57] ABSTRACT

A rear projection screen having means for controlling light direction comprising a light diffusion plate composed of wax, a crystalline polymer or a mixture thereof, and light shielding layers contained in the light diffusion plate which are parallel to the direction of image projection.

12 Claims, 3 Drawing Figures

U.S. Patent   Jan. 3, 1978   4,066,332
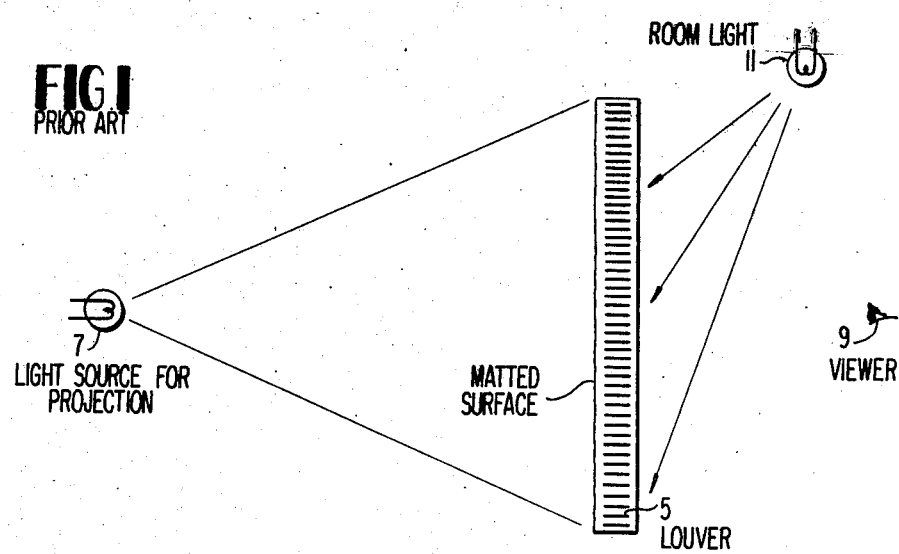
FIG. 1 PRIOR ART
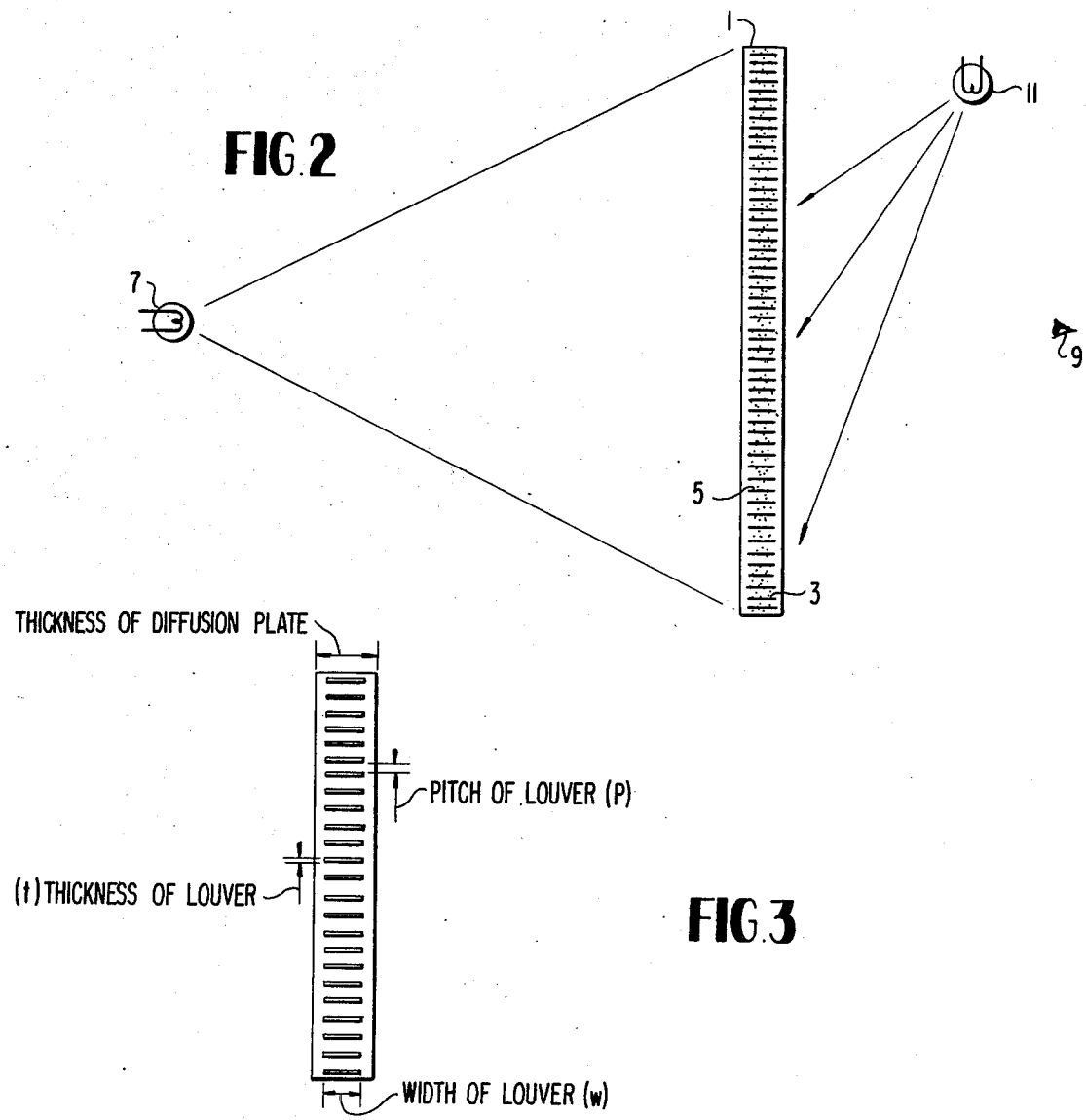
FIG. 2
FIG. 3

REAR PROJECTION SCREENS

BACKGROUND OF THE INVENTION

1. Field of the Invention

The present invention relates to a screen for an optical instrument, e.g., a microfilm reader, which can be under used normal room illumination conditions (hereinafter referred to as a rear projection screen). More particularly, the present invention is concerned with a rear projection screen having a luminance range sufficient to faithfully reproduce the density range of a projected image.

2. Description of the Prior Art

Recently, high performance rear projection screens have been required with the development of microfilm technology. In particular, as an image to be projected changes from a character or line drawing to one of a wide density region and continuous gradation, e.g., an X-ray photograph for medical use and a color image, much higher performance has been required.

The properties required for such a rear projection screen are as follows:

1. Desired light redistribution characteristic

Light is uniformly redistributed only in the predefined audience viewing range in such a manner that the luminance viewed from any point in the audience viewing range is substantially constant.

2. Low scintillation

This property is very important with respect to the ease of viewing and viewing fatigue.

3. Wide image-reproduction range (high contrast)

To enlarge the image reproduction range of a screen, the value of the equation:

$$\frac{\text{Luminance of Screen due to the Light Source of the Projection Unit}}{\text{Luminance of the Illumination on the Surface of the Screen due to Room Light}}$$

(i.e., the signal/noise ratio) must be made as large as possible. For this purpose, one can:

a. Increase the luminance of the light source of the projection unit.

b. Increase the transmittance and decrease the reflectance of a screen diffusion plate.

c. Use a transparent plastic sheet having the louver structure in the form of Venetian blind. 4. High resolving power An improved rear projection screen based on the above considerations, in which a means for shielding room light in the form of Venetian blind is used, is shown in FIG. 1. This screen is described in U.S. Pat. No. 2,053,173, in which transparent plastic sheets with a black varnish coated on the surfaces thereof are laminated and cut at a right angle to the surface of the laminated sheet and the resulting sheet is matted on one side and used as an image-forming surface of a screen.

In this screen, a number of light-shielding layers in the form of Venetian blind, which are at right angles to the surface of the sheet (hereinafter referred to as a louver), shield room light incident upon the screen at an angle exceeding a certain angle, and thus they act to broaden the reproduction range (contrast) of a screen.

Plastic sheets of such a louver structure are used not only as a projection screen, but also for the purposes of:

1. increasing contrast by decreasing the influence of room light.

2. reducing scintillation, and 3. limiting the viewing angle.

For example, they can be mounted on the surface of instrument panels for the purpose of preventing surface reflection, or they can be mounted on a CRT display surface to improve the contrast thereof, or they can be used as directional projectors in combination with a light source.

The above properties which result from the louver structure are preferred in a rear projection screen.

The rear projection screen shown in FIG. 1 has the advantage that the image reproduction range is markedly broadened because the louver structure prevents reflection of room light. This screen, however, has the serious disadvantages explained hereinafter.

Firstly, in the case of a rear projection screen of a structure as shown in FIG. 1, light coming from the matted surface appears as scintillation, which is very unpleasant to an observer and causes eye fatigue. Since the matted surface fails to sufficiently transmit light to form an image due to high reflectance thereof and the reflected light is visible to an observer as stray light, the reproduction range (contrast) of the screen is reduced, and thus the effect of the louver structure is reduced.

It has been proposed to coat light-diffusing particles dispersed in a binder in place of the matted surface on one side of a transparent plastic sheet of the louver structure. In this case, however, scintillation is high and the reflectance of the light diffusion layer is high, and thus this modification suffers from the same defects as with the use of a matted surface.

SUMMARY OF THE INVENTION

Accordingly, the object of the present invention is to remove the defects of the prior art, and to provide a rear projection screen of low scintillation which has a broad image reproduction range and which is simple to produce.

This object is attained by incorporating a light direction controlling-means with light shielding layers parallel to the direction of image projection in a wax light diffusion plate or crystalline polymer light diffusion plate.

BRIEF DESCRIPTION OF THE DRAWINGS

FIG. 1 is a schematic view of a conventional rear projection screen.

FIG. 2 is a schematic view of a rear projection screen of the present invention.

FIG. 3 is a schematic view of a rear projection screen in accordance with the present invention with various reference points for measurements set forth thereon.

DETAILED DESCRIPTION OF THE INVENTION

The room light shielding capability of a plastic sheet with a louver structure can be roughly evaluated by the ratio of the width of the louver in the direction at a right angle to the sheet surface, i.e., width of the louver to the pitch of the louver (i.e., grid ratio). With respect to this parameter, as the grid ratio increases, the light-shielding capability increases, and thus a certain sheet thickness is necessary, in accordance with the width of the louver, i.e., sheet thickness is not less than the width of the louver. Most practically usable widths, as described hereinafter, are about 0.5 mm, for example.

As explained above, the grid ratio is the ratio of the width of the louver ($w$) to the pitch of the louver ($p$).

While this grid ratio can be used as a theoretical basis to ascertain most effective rear projection screens in accordance with the present invention, since incident light is refracted at the interface between air and a diffusion plate, in order to estimate light-shielding capability with maximum accuracy the refractive index of the diffusion plate material must be considered. The effective grid ratio as defined below was reached as a result of considering the influence of the refractive index of the diffusion plate material, and takes into account the fact that the light-shielding capability is determined by the path of the light in the diffusion plate. The effective grid ratio is defined as follows:

$$\text{Effective grid ratio} = \frac{\text{Width of the louver (w)}}{\text{Refractive index of the light diffusion material (n)}} \bigg/ \text{Pitch of the louver (p)}$$

The above parameters are exemplified in FIG. 3, where $w$ and $p$ are in mm and $n$ is unitless.

Taking into account the fact that a wax or polymer diffusing material possesses preferred characteristics, no reduction in resolving power, low scintillation, low reflectance and a suitable diffusion capability (through its thickness is relatively large e.g., even 0.5 mm) due to the diffusion mechanism, the inventors found that it is possible to use the above wax or light diffusing polymer directly as a substrate for the louver structure instead of providing light diffusing properties to a transparent plastic sheet with the louver structure of FIG. 1. With conventional diffusing materials of the type where light diffusing particles are dispersed in a binder, if the diffusion layer has a thickness of about 100 μ its properties as a screen such as resolving power, transmittance, etc., rapidly decrease and thus no diffusing material has been useful at such high thicknesses.

In the following discussion, certain terms will be used, which terms will now be defined. Firstly, the term "transparent" as is used herein designates the property that a material does not substantially scatter and/or diffuse light and allows light to pass therethrough to a certain extent, i.e., at least the major portion of the incident light is transmitted through the diffusion plate. Accordingly, a transparent plate is a plate through which objects can be seen. A light diffusing plate such as wax is not called a transparent plate even though it allows light to pass therethrough. Furthermore, transparent glass plates whose transmittance is decreased by coloring are transparent.

Known plastic sheets of the known louver structure are "transparent," and are intended to be used in combination with other image generating instruments such as a CRT display, an instrument panel or a light diffusing material for rear projection screens. It has not been known to combine the function of a light diffusing material as an image forming surface (a kind of image generating instrument) and the function of shielding stray light by the use of an opaque light diffusing sheet (the louver structure) as proposed in the present invention.

The term "wax" as is used herein designates a solid having a waxy appearance and waxy properties at room temperature, e.g., a material which is translucent, soft, brittle, and, by itself, substantially non-film forming, etc.

Suitable examples which can be used in the present invention, are as follows:

I. Natural wax (supplied from animals and plants)
Japan wax, carnauba wax or cotton wax (plant wax); insect wax, bees wax or whale wax (animal wax).

II. Petroleum wax (which is a solid hydrocarbon at normal room temperature obtained from petroleum) such as
paraffin wax having a boiling point of not less than 125° F, microcrystalline wax (e.g., Hi-Mic produced by Nippon Seiro Co.).

III. Synthetic waxes (wax-like solids obtained by synthesis) such as
oligomer waxes, e.g., vinyl oligomer wax such as ethylene oligomer waxes, propylene oligomer waxes, ethylene oxide oligomer waxes, propylene oxide oligomer waxes or a mixture thereof. Ethylene oxide oligomer wax is sold as Carbowax by E. I. du Pont de Nemours & Co., Inc. Oligomer waxes have a molecular weight of not more than about 10,000, preferably not more than 5,000. The oligomer waxes employed in this invention are solids having a waxy external appearance and waxy properties and have a melt index of not less than about 1,000 (according to the method of JISK 6760 (1971)).

As should be apparent to one skilled in the art, mixtures of various compatible waxes as set forth above can be used as desired.

Therefore, a light diffusion plate containing wax as the light scattering material means a light diffusion plate which is produced by forming a wax as above into a sheet having a maximum thickness of about 4 mm by casting, injection, extrusion, or a like method, in which the light diffusion properties of the wax are utilized.

In wax and in crystalline polymers there is an internal irregular refractive index distribution due to the irregular microstructure of crystalline/amorphous zones, and thus such wax and crystalline polymers show an excellent diffusion effect. Based on this concept, the diffusion material used in the present invention is not limited to the crystal/amorphous structure, and there can be used a method, for example, in which latexes, which comprise fine particles of a wide size distribution, are produced from transparent materials having slightly different refractive indexes and which are mutually soluble, and the mixture of such transparent materials is formed into a sheet-like form and dissolved with heating, a solvent, or the like to make the interface of the latex continuous.

Crystalline polymers as used herein are those polymers which have a molecular weight of not less than about 10,000, preferably not less than 20,000, which are film-forming by themselves, are solids having a structure a part or all of which shows a crystallization state, such as polyolefins, e.g., polyethylene, polypropyrene, and the like, polystyrenes, polycarbonates, polyesters such as polyethylene terephthalate, polyamides such as nylon-6, 6, polyurethanes such as polytetramethylene-hexamethylene urethane, polyvinyl alcohol, polyesters, polyethers, polyoxymethylenes, etc.

Thus, crystalline polymer light diffusion plates containing crystalline polymers as light scattering materials are those light diffusion plates produced by forming the above crystalline polymers into a sheet-like form by rolling, extrusion, injection molding, or the like.

As the light diffusion materials for forming light diffusion plates of the present invention, wax can be used alone or mixtures of wax and crystalline polymers can be used.

In the case where the diffusion plate is produced from wax alone, those polymers miscible with wax (wax modifying agents) can be incorporated into the wax to improve the mechanical strength of the diffusion plate without deteriorating its optical characteristics. Such a procedure has been disclosed by the inventors in Japanese patent application No. 446/1975.

As typical examples of wax reforming agents (for improving the mechanical strength and adhesiveness of wax without losing the excellent optical properties of wax) which are polymers miscible with the wax, there are:

I. Natural substances and derivatives thereof such as rosins (e.g., rosin, modified rosin or rosin esters), terpene resins, terpene phenol resins and other natural resins.

II. Synthetic resins such as resins containing polar groups (e.g., phenolic resins or xylenic resins), petroleum resins (e.g., aliphatic, alicyclic or aromatic petroleum resins), cumarone-indene resins or styrene resins. More preferred materials are ethylene-vinyl acetate copolymers (hereinafter referred to as "EVA"), polyisobutylene (preferred molecular weight: about 35,000 to about 2,100,000), polybutene (preferred molecular weight: about 500 to about 3,000), rosin and atactic polypropylene. Preferred EVA's contain about 15 to about 40% vinyl acetate and have a melt index of about 200 to about 400 (by JISK 6760 (1971)), for example, "Evaflex" manufactured and sold by Mitsui Polychemical Co., Ltd. One useful polyisobutylene is available as "Vistanex" manufactured by Esso Co., Ltd. Compatible mixtures thereof can also be used.

The amount of the wax reforming agent added is about 0.1 to about 80 wt%, based on the total weight of wax and all additives. For instance 1 to 50 wt% EVA, 0.5 to 20 wt% polyisobutylene and 1 to 20 wt% polybutene (same basis) can be used to form highly preferred systems. Where the difference of refractive index between the wax reforming agent and the wax is small, whereby mechanical strength and adhesiveness are increased without losing optical properties, larger amounts of the wax reforming agent can be added.

The present invention will now be explained by way of example with reference to FIG. 2, in which 1 is a rear projection screen, 3 is a light diffusion plate, 5 is a light shielding layer (louver) provided in the light diffusion plate 3 vertically with respect to the surface of the diffusion plate 3, 7 is a light source for projection, 9 is a viewer, and 11 is a room light.

Reference should also be made to FIG. 1 which shows a rear projection screen in accordance with the prior art which comprises a transparent plastic plate having a matted surface and a louver structure therein.

The image projected on screen 1 by the projection light source 7 reaches the eyes of the viewer 9 through the diffusion effect of the diffusion plate 3. At this time, since louvers are placed substantially parallel to the line connecting the light source 7 and the observer 9, there is very little possibility of the light carrying the image being absorbed by the louver. Furthermore, an image of high luminance and low scintillation is provided due to the excellent screen properties of the wax or crystalline polymer, i.e., high transmittance and low scintillation.

On the other hand, light from the room light 11 illuminating the surface of the screen is generally incident diagonally on the screen, and is absorbed by the louvers, and thus such room light is not reflected back to the viewer to reduce the contrast of the screen. On the other hand, the room light incident substantially vertically on the major screen surface is often not absorbed by the louvers since, essentially, the louvers present only their thin face thereto. In this case, however, the light is rarely reflected to the viewer due to the low reflectance of the wax or crystalline polymer used as the diffusion plate material, and is allowed to pass through to the side of the projection light source 7, whereby no reduction in the contrast of the screen is caused.

With regard to the pitch of the louver, it is desired to make it small to the extent that it cannot be distinguished by the naked eye of a viewer. This condition greatly varies depending on whether viewing is carried out at close range, as in a microreader, or if a large screen is viewed from a distance, as in the movies. In the case of a microreader screen, the pitch is preferably not more than about ¼ mm, and even in the case of a large sized screen, the pitch is preferably not more than about 2 mm. While not mandatory, and not as important as the preferred maximum pitch, usually small size screens have a pitch greater than about 0.01 mm and large size screens have a pitch greater than about 0.25 mm, on a commercial scale.

The thickness of the louvers themselves are desirably be made as small as possible from the viewpoint of increasing the image transmittance. Practically used thickness will range between about 50 $\mu$ and about 1 $\mu$.

The grid ratio of the louver is a important factor in evaluating the light shielding properties thereof, and the most suitable value varies depending on the conditions of use of the rear projection screen. It is desirably about 0.3 to about 3 as an effective grid ratio.

The louvers of the present invention can be formed if any substance which is opaque to light, most preferably an opaque substance which has a high absorption coefficient. Typical examples of the materials used to form the louvers in accordance with the present invention are black printers ink, black varnish and, e.g., materials as are disclosed in U.S. Pat. No. 2,053,173, hereby incorporated.

The thickness of the screen diffusion layer of the present invention will now be considered. In realizing a screen of the present invention in which the pitch of the louver is 300 $\mu$, the effective grid ratio is 1 and the refractive index of the diffusion plate material is 1.5, the width of the louver is required to be 450 $\mu$, i.e., the width of the louver $(w) = 1.0 \times 300 (\mu) \times 450 \mu$. This means that the thickness of the light diffusion material layer must be at least 450 $\mu$. Only wax or crystallive polymer diffusing materials have characteristics as a diffusing material for a rear projection screen at such thickness. With conventional diffusing materials in which diffusing particles are dispersed, at such a thickness resolving power is greatly decreased and useful characteristics as a diffusing material for the rear projection screen are lost.

In production of the screens of the present invention, those methods of producing transparent plastic sheets of a louver structure known in this art can be used without modification. The only difference is that wax or crystalline polymer sheets are used as light diffusing materials in place of conventional transparent plastic sheets.

For example, in accordance with the method described in U.S. Pat. No. 2,053,173 a wax or crystalline polymer sheet with black varnish or the like coated on the surfaces thereof are laminated to produce a solid block, and the resulting solid block is cut away in a direction at a right angle thereto, i.e., typically a number of relatively wide wax or polymer sheet assemblies having a black varnish or the like coated on one surface thereof are laminated (the front black varnish surface of one assembly contacting the rear uncoated surface of an adjacent assembly) and then the composite laminate cut in the direction vertical to the major plane of the black varnish layers to provide a plurality of diffusion plates.

The side of the screen which faces the viewer can be a non-glare surface (slightly matted surface) so that the observer and scenery are not reflected on the screen surface in a mirror-like fashion. One or both sides of the screen can be provided with surface micro-optical elements such as a lenticular lens, fly's eye lens, Fresnel lens, or a like structure for the purpose of improving the light redistribution characteristics. Various matting procedures and procedures for forming such surface micro-optical elements are described in, for example, U.S. Pat. No. 2,726,573, U.S. Pat. No. 2,480,031, Australian Pat. No. 130,137, and in Japanese patent application 14,561/75, all hereby incorporated. Furthermore, if desired, the screen can be adhered to a transparent support such as glass, acrylic resin, polycarbonate, polystyrene, polyvinyl chloride, polyethylene terephthalate, cellulose triacetate, etc. In this case, the transparent support can be colored in order to control the color quality of the light in the projected images and to raise the contrast of the projected images.

The above material has dealt with the present invention in general, and will enable one skilled in the art to form various rear projection screens in accordance with the present invention. However, as with most inventions, for commercial products certain very highly preferred ranges do exist, and these are set forth below in combination with generally used ranges to enable one skilled in the art to appreciate what are currently viewed as best modes of practicing the present invention.

Firstly, the louver pitch in a commercial scale will generally be from about 0.05 to about 5 mm, preferably 0.1 to 2 mm and most preferably 0.25 to 1 mm. The louver thickness will, on commercial scale, generally be from about 0.5 to about 200 $\mu$, more preferably from 1 to 50 $\mu$. The louver width on a commercial scale will generally be from about 0.05 to 4 mm, more preferably 0.1 to 2 mm and most preferably 0.25 to 1 mm. The ratio of the louver width to the total diffusion plate width is a secondary parameter, but on a commercial scale this will be 0.5 to 1 (obviously it will never be greater than 1 for practical purposes), more preferably 0.8 to 1.

In generally, a protective layer will be coated on both surfaces of the rear projection screen of the present invention in order to provide extra protection for the louvers. The protective layer is typically very thin and will be made of a same material as the diffusion plate material, though this is not mandatory and other transparent material which adhere well to the diffusion plate material can be used. In those instances where protective layers are used, the total diffusion plate thickness described below includes the thickness of the protective layers.

Generally, the total diffusion plate thickness will be from 0.1 to about 4 mm on a commercial scale, more preferably 0.1 to 2 mm and most preferably 0.25 to 1 mm.

Highly preferred results are obtained when the effective grid ratio of the rear projection screen of the present invention is from about 0.3 to about 3, even more preferably from 0.5 to 2.

The present invention will now be illustrated in detail with reference to the following example of a presently preferred embodiment.

EXAMPLE 1

The same structure as is shown in FIG. 2 (as explained by FIG. 3) was formed. The louver thickness was 15 $\mu$, the louver pitch was 200 $\mu$ and the louver width was 500 $\mu$. The louvers were formed of a black varnish, and the structure was formed in accordance with the method described in U.S. Pat. No. 2,053,173, i.e., a plurality of polypropylene blocks (melt index 10; density 0.903 g/cm$^3$; refractive index = ca. 1.49) 200 $\mu$ thick and 500 $\mu$ wide had black varnish coated on one face thereof, and then the black varnish-coated face of one polypropylene block was laminated to the uncoated face of an adjacent polypropylene block to provide a light diffusion plate having a diffusion plate thickness of 500 $\mu$. This member was designated Screen A. For comparison, the same polypropylene sheet as used above and having a thickness of 500 $\mu$ was produced as a light diffusion plate sheet but no louvers were used. This member was designated Screen B. Furthermore, for comparison, a member of the same structure as Screen A was produced using a transparent plastic cellulose diacetate sheet as a medium and its one side was matted. Matting was performed by sand blasting using silicon carbide having a particle size of 100 mesh. The light scattering angle of this screen was 16°. This member was designated Screen C.

The optical properties of these screens were evaluated by mounting them on a Microreader Model R 12 S produced by Fuji Photo Film Co., Ltd. The results obtained are shown in Table 1.

This table shows that the rear projection screen of the present invention has excellent properties.

Table 1

|  | Screen A | Screen B | Screen C |
| --- | --- | --- | --- |
| Light Scattering Properties* | 15° | 15° | 16° |
| Scintillation | Extremely low | Extremely low | High |
| Reproduction** Range | 2.7 | 2.3 | 2.6 |
| Resolving Power | 9 or more lines per 1 mm | 9 or more lines per 1 mm | 9 or more lines per 1 mm |

*Distribution of light scattering angle is measured with a gonio photometer, and the scattering angle at which the light intensity is ½ of that at a scattering angle of 0° is determined.

**log ( $\frac{\text{Maximum Luminance of Screen}}{\text{Minimum Luminance of Screen}}$ ) according to the measuring method of ANSI PH 5.10-1969.

The present invention, as described above, provides a rear projection screen in which light direction controlling means with light shielding layers parallel to the direction of image-projection are provided in a wax light diffusion plate or a crystalline polymer light diffusion plate. Thus, the present invention has the following advantages.

A rear projection screen can be obtained which avoids various disadvantages encountered with conventional rear projection screens and which has excellent screen properties. In more detail, the rear projection screen of the present invention has the following advantages:

1. High contrast and broad image reproduction range;
2. Extremely low scintillation and a marked reduction in viewer fatigue;
3. High resolving power;
4. Ease of production and suitability for mass production; and
5. Low production cost.

While the invention has been described in detail and with reference to specific embodiments thereof, it will be apparent to one skilled in the art that various changes and modifications can be made therein without departing from the spirit and scope thereof.

What is claimed is:

1. A rear projection screen comprising a light diffusion plate formed of a material selected from the group consisting of wax, a crystalline polymer and mixtures thereof, and light shielding layers contained in said light-diffusion plate, said light shielding layers being parallel to the direction of image projection.

2. The rear projection screen according to claim 1, wherein the wax is selected from the group consisting of natural wax and petroleum wax.

3. The rear projection screen according to claim 1, wherein the crystalline polymer has a molecular weight of not less than about 10,000.

4. The rear projection screen according to claim 3, wherein the crystalline polymer is selected from the group consisting of polyolefins, polystyrenes, polycarbonates, polyesters, polyamides, polyurethanes, polyvinyl alcohols, polyesters and polyethers.

5. The rear projection screen according to claim 1, wherein the thickness of any light shielding layer is about 50 to about 1 82 .

6. The rear projection screen according to claim 1, wherein the effective grid radio of the light shielding layer is about 0.3 to about 3, effective grid ratio being calculated by the formula:

$$\text{Effective grid ratio} = \frac{\text{Width of the louver (w)}}{\text{Refractive index of the light diffusion material (n)}} \bigg/ \text{Pitch of the louver (p)}$$

7. The rear projection screen according to claim 1, wherein the wax is synthetic wax.

8. The rear projection screen according to claim 1, wherein the molecular weight of synthetic wax is not more than about 5,000, and the melt index of the synthetic wax is not less than about 1,000.

9. The rear projection screen according to claim 1, wherein the thickness of the light diffusion plate ranges between about 0.1 to 4 mm.

10. The rear projection screen according to claim 2, wherein the light diffusion plate further contains a wax modifying agent.

11. The rear projection screen according to claim 7, wherein the light diffusion plate further contains a wax modifying agent.

12. A rear projection screen comprising a light diffusion plate formed of a material selected from the group consisting of wax, a crystalline polymer and mixtures thereof, and light shielding layers contained in said light-diffusion plate, said light shielding layers being parallel to the direction of image projection, the thickness of the light diffusion plate ranging between 0.1 to 4 mm.

* * * * *